United States Patent
Jacoby, Jr. et al.

(10) Patent No.: US 6,358,409 B1
(45) Date of Patent: Mar. 19, 2002

(54) OIL SKIMMER

(75) Inventors: William L. Jacoby, Jr., South Elgin; Harold Donald Anderson, Wheaton; Thomas J. Danowski, Schaumburg, all of IL (US)

(73) Assignee: Safety-Kleen Systems, Inc., Elgin, IL (US)

(*) Notice: Subject to any disclaimer, the term of this patent is extended or adjusted under 35 U.S.C. 154(b) by 0 days.

(21) Appl. No.: 09/470,872

(22) Filed: Dec. 23, 1999

(51) Int. Cl.[7] .............................. C02F 1/40; B01D 21/00
(52) U.S. Cl. ........................ 210/168; 210/122; 210/194; 210/242.3; 210/416.5; 210/923
(58) Field of Search ............................... 210/168, 242.3, 210/194, 122, 416.5, 923

(56) References Cited

U.S. PATENT DOCUMENTS

| | | | |
|---|---|---|---|
| 3,690,463 A | * | 9/1972 | O'Brien |
| 3,762,557 A | | 10/1973 | Tudor et al. |
| 3,962,093 A | | 6/1976 | Gibson |
| 4,224,162 A | | 9/1980 | Ayroldi |
| 4,277,334 A | | 7/1981 | Ruidisch et al. |
| 4,301,008 A | | 11/1981 | Baffert et al. |
| 4,361,488 A | | 11/1982 | White et al. |
| 4,405,458 A | | 9/1983 | McHugh, Jr. |
| 4,610,788 A | | 9/1986 | Ward |
| 4,892,666 A | | 1/1990 | Paulson |
| 5,053,145 A | | 10/1991 | Ellison |
| 5,143,603 A | | 9/1992 | Gibbs |
| 5,160,605 A | | 11/1992 | Noestheden |
| 5,492,619 A | | 2/1996 | Batten |
| 5,498,348 A | | 3/1996 | Plink et al. |
| 5,514,266 A | | 5/1996 | O'Brien et al. |
| 5,622,627 A | | 4/1997 | Fanning et al. |
| 5,730,872 A | * | 3/1998 | Rhodes |
| 5,814,213 A | | 9/1998 | Glasgow |
| 5,897,773 A | * | 4/1999 | Rhodes |

* cited by examiner

Primary Examiner—Thomas M. Lithgow
(74) Attorney, Agent, or Firm—Vedder Price Kaufman & Kammholz

(57) ABSTRACT

An apparatus for skimming a layer of oil from an aqueous surface which includes a body portion having a horizontal opening. There is a collection tube secured to the opening and a suction tube having a lower end located in said collection tube. The body portion has a float secured thereto and has a guide element extending through the float.

18 Claims, 4 Drawing Sheets

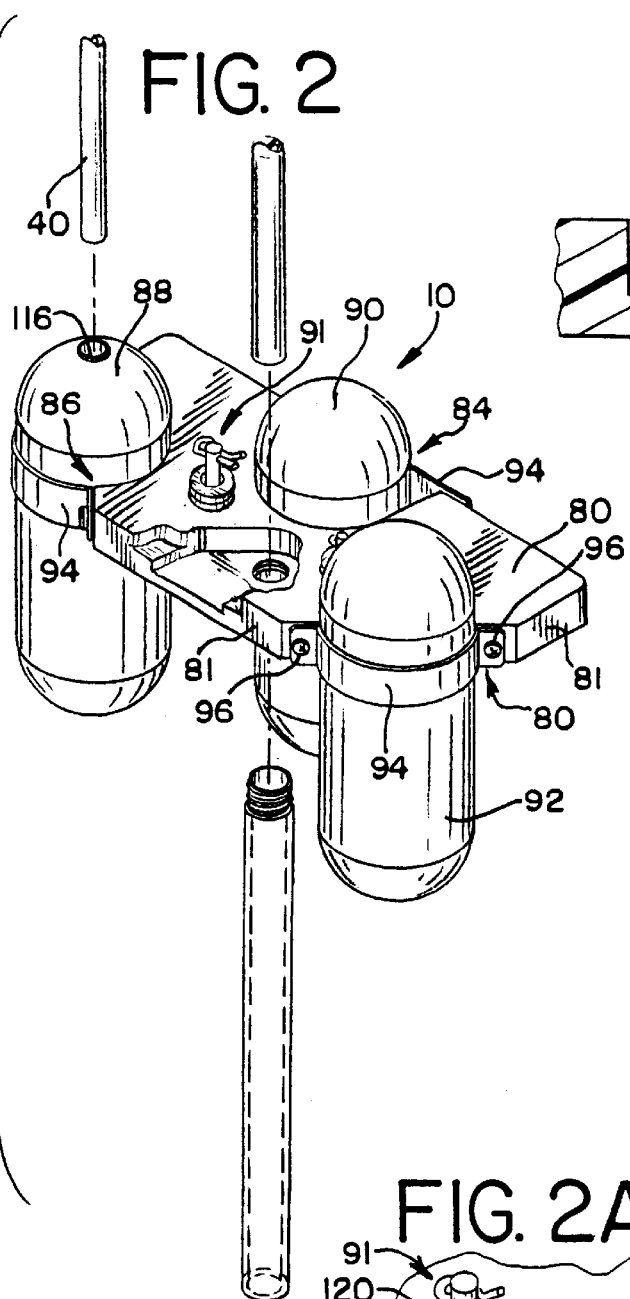
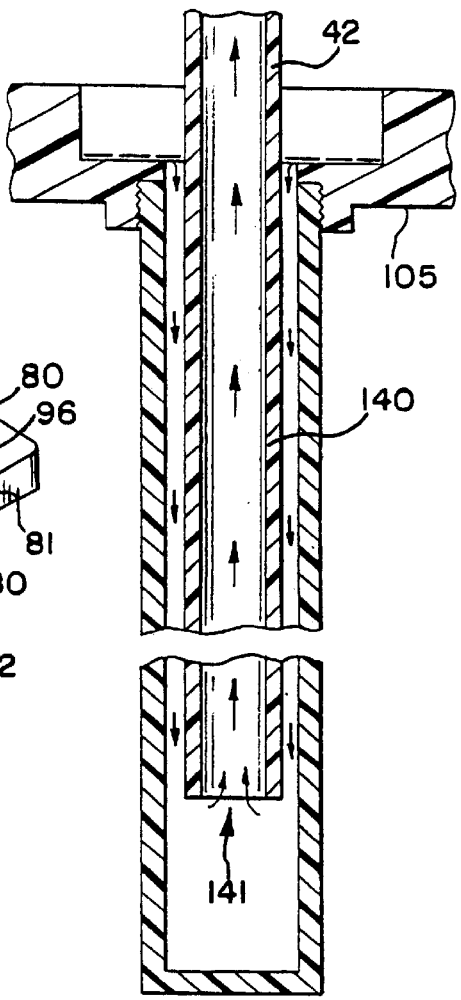
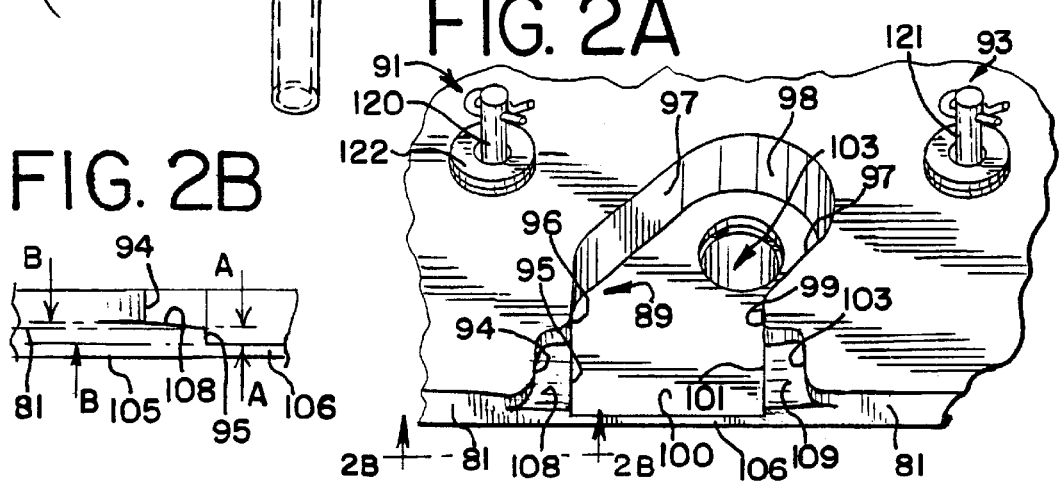

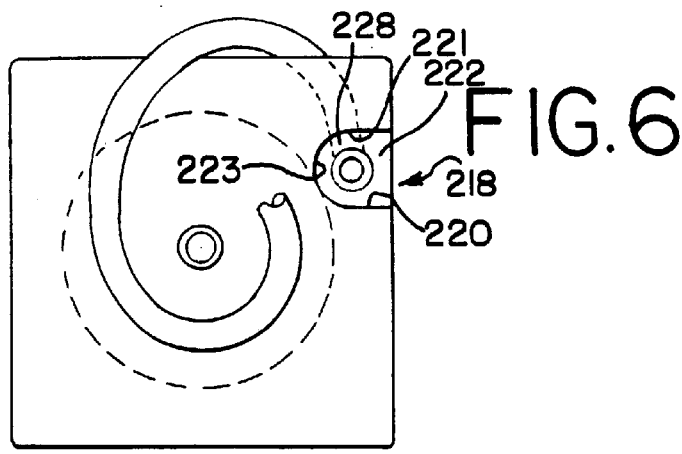
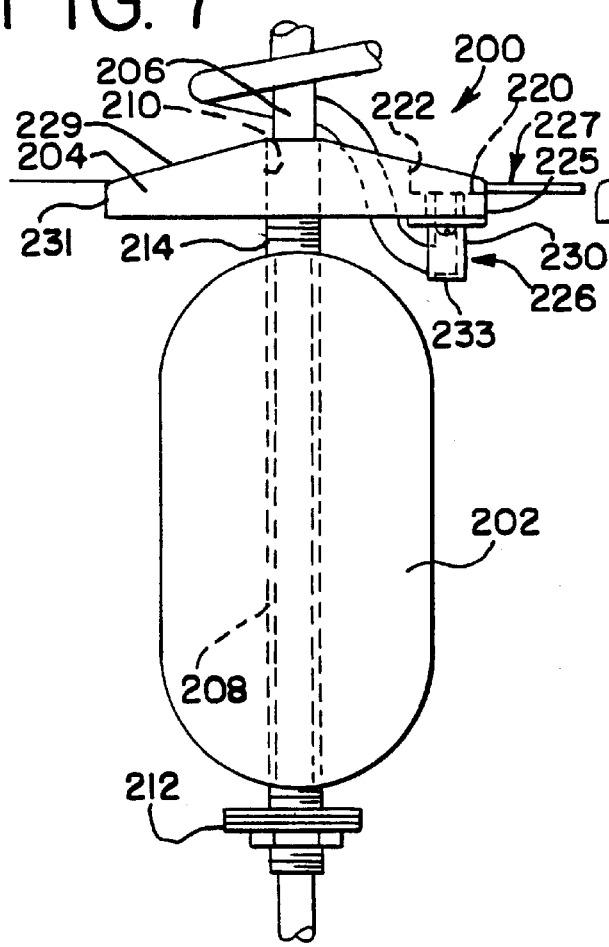
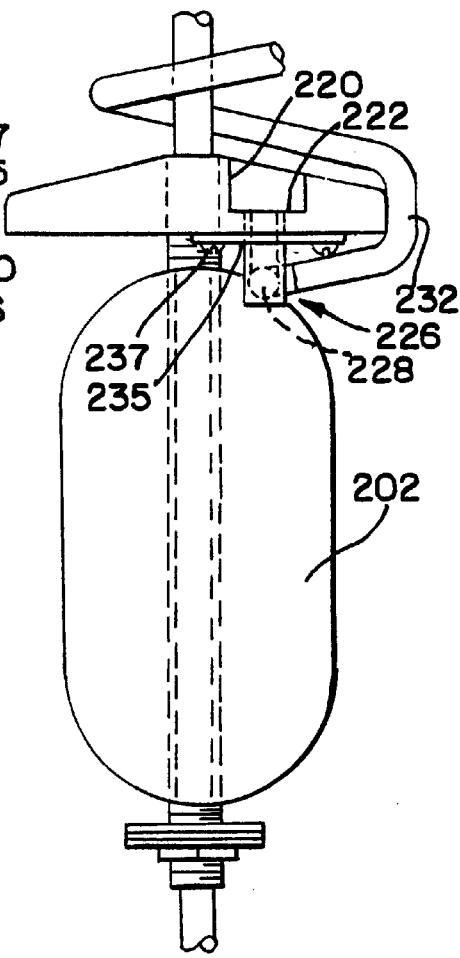

OIL SKIMMER

BACKGROUND OF THE INVENTION

The present invention relates to oil-water separation, and more particularly, to a small, compact apparatus designed to skim a layer of oil from an aqueous surface, usually a thin film resting on top of the water in an immersion tank, such as a hot tank or the like.

When skimming a thin film of oil or grease from the top surface of the water in an aqueous parts cleaner system, there are a number of problems commonly encountered. First, the skimmer must be designed so as to float on top of the water, but more importantly, to float at almost exactly a desired level. This is to insure that, under most conditions, only a very thin layer of water, and the oil resting on top thereof, be skimmed off. While the action of floating itself is not ordinarily a problem, especially with hot tanks and the like, the temperature of the water in immersion cleaners can vary considerably. It is not uncommon to find a variety of operating water temperatures of from 100° to 110° up to 180° or more. Even those baths that are intended to be carefully controlled have water temperatures that may fluctuate between 130° and 165° F., for example.

Consequently, assuming that a device has a body and an inlet that is intended to operate at exactly a certain level of submergence to skim the oil from the surface of the water, in other words, to have an exactly intended "skim gap", thermal expansion of the floating body must be taken into account. If, for example, the skim gap is set at a certain dimension, say $7/64"$, an increased water temperature will result in lower water density. This causes the floating body of a fixed volume and weight to sink down a slight amount, thereby increasing a preset skim gap.

Assuming there is a thin layer of oil on the water surface, enlarging the skim gap in turn would result in drawing an excess of water relative to oil into the collection tube. On the other hand, a reduction in temperature of the aqueous bath would cause the density of the aqueous bath to rise. This would cause the float to rise to a level whereby, in an extreme case, the skim gap would be entirely eliminated. Consequently, it would be desirable to have a floating skimmer which would be relatively insensitive to changes in temperature, at least throughout a significant range of the temperatures likely to be encountered in use.

Operating the aqueous bath in a narrow range of temperature, however, is not as easy as it may appear. This is because, in the case of some parts which are both massive and relatively cold, placing them into a heated immersion tank would lower the temperature considerably. The thermostat, although attempting to control the temperature, is still faced with a rather substantial induced variation in temperatures, at least in the short run. Furthermore, the materials from which the present skimmer is made obviate any problems with operating a hot tank at temperatures up to 180° F., for example.

The configuration of certain embodiments of the present invention is also important. This configuration is such that there is provided a horizontal inlet into the body within a recess formed by contoured side walls and, preferably a flat bottom shelf. The oil to be separated by the surfactant forms a relatively thin film on top of the water, in most cases. In some cases, of course, the oil film may be very thick at the beginning of a new cycle, however, within a short time it again assumes the dimensions of a thin film.

It is thought that when a thin layer of oil atop a layer of water passes through a skimmer's horizontal inlet, the water may cling to the lower shelf and establish a Prandtl boundary layer whose velocity gradient effects a certain amount of separation by retarding the flow of water relative to the oil layer.

Other considerations include the skim gap whose optimum value will vary depending, among other things, upon the type of pump used to remove the skimate. For example, a $7/16"$ skim gap was found to work well with a bellows pump pumping at one pint per minute.

The skim gap is relatively critical and the float and weight construction of the present invention makes it easy to maintain such a relationship. Consequently, with a properly designed skimmer, substantial amounts of oil pass into the collection tube, and these can be readily removed therefrom by a pump.

In addition, it has been found that the body of the skimmer preferably should be located in a corner of the hot tank, inasmuch as, in most cases, convection currents caused by the heater generally favor flow of the oil film into a corner of the bath. Consequently, the skimmer is preferably oriented so that the opening in the skimmer faces outwardly from this corner area. The skimmer maintains this orientation by one or more novel and stable guide arrangements, yet none of which causes substantial friction by reason of moving up and down as the level of water changes in the tanks.

In view of the failure of the prior art to provide a small or compact, low cost, reliable skimmer that will skim a variety of oil films from the surface of a controlled environment, such as for example a hot tank, it is an object of the invention to provide an improved oil skimmer.

Another object of the present invention is to provide a skimmer which includes a submersible collection tube, and a contoured inlet to such tube formed in the side wall of a floating body.

Yet another object of the present invention is to provide a floating body which includes one or several floats in addition to the principal body member itself.

Still another object of the present invention is to provide a skimmer which includes at least one guide, and in some cases two guides, extending down through one of the floats (and elsewhere) to guide the skimmer in its vertical movement.

A further object of the present invention is to provide a floating skimmer which includes plural floats and a body as well as an inlet formed in the body, and whose vertical movement is determined by two guides which permit only vertical movement of the skimmer.

A still further object of the present invention is to provide a relatively fixed suction tube for oil and water which are made to accumulate in a collection tube.

An additional object of the present invention is to provide, in a different embodiment, a shallow collection cup and an extensible suction hose or the like for continuously withdrawing oil and water from the collection cup.

Another object of the present invention is to provide a collection tube which in one embodiment, is concentrically arranged with a suction tube, serving the dual function of acting as a guide for movement of the skimmer as well as collecting the mixture that accumulates therein.

Still another object of the present invention is to provide a skimmer and an appropriate fluid circuit for removing an oil-aqueous solution from the surface to be skimmed, depositing the mixture in a reservoir and returning the aqueous solution from the bottom of the reservoir to the hot tank, allowing the oil eventually to accumulate to a point where it substantially fills the reservoir.

Yet another object of the present invention is to provide a skimmer which is operable with a low-capacity intermittent suction pump.

Still another object of the present invention is to provide a skimmer with a horizontal opening for oil-aqueous solution, with the opening surrounded being by a flat shelf portion defined by contoured side walls.

A further object of the present invention is to provide a tank for aqueous solution and an oil film with a skimmer device which resides in one corner of the tank, preferably having the skimmer shrouded where it is protected from contact with parts which are immersed in the tank.

A still further object of the present invention is to provide a skimmer which is small, reliable and which may be produced at relatively low cost.

Another object of the present invention is to provide a skimmer having a readily accessible provision for adding or taking off weight in small increments to vary the skim gap precisely.

Yet another object of the present invention is to provide a skimmer with an inlet having vertical and near-horizontal surfaces making visualization of the skim gap easier and more reliable.

An additional object of the present invention is to provide a skimmer having a skim gap which is substantially independent of the temperature of the aqueous bath in which it is situated.

Another object of the present invention is to provide a skimmer whose effective thermal cubic expansion is essentially equal to that of bath so that variations in bath temperatures will have negligible effect upon the skim gap.

The invention achieves these and other objects by providing a floating skimmer having a body with a contoured inlet, a flat bottom shelf and a horizontally disposed opening, a reservoir disposed within the opening and a suction tube communicating with the reservoir, with the space between the aqueous level in the tank and the shelf being a carefully controlled skim gap.

The manner in which these and other objects and advantages of the present invention are achieved in practice will become more apparent when reference is made to the following description of the preferred embodiments of the invention and shown in the accompanying drawings, wherein like reference numbers indicate corresponding parts throughout.

BRIEF DESCRIPTION OF THE DRAWINGS

FIG. 2 is a greatly enlarged perspective view, with portions broken away, of the body, the floats, the adjusting weights for the skim gap and the collection tube and other elements of the skimmer of the present invention;

FIG. 2A is a further enlarged view showing a portion of the body, the recess, the inlet to the collection tube, the arrangement for draining an oil film back to the aqueous bath, and the weights and weight holders for varying the skim gap of the float of the invention;

FIG. 2B is a further enlarged view of the tapered portion of the entrance to the recess of the float;

FIG. 5 is a greatly enlarged vertical sectional view showing portions of the float including its inlet, the collection tube, and the suction tube of the invention;

FIG. 6 is a top plan view of a different embodiment of the invention;

FIG. 7 is a side elevational view of the embodiment of FIG. 6; and,

FIG. 8 is an elevational view, taken 90° from the view of FIG. 7.

DESCRIPTION OF THE PREFERRED EMBODIMENTS OF THE INVENTION

Figure 1:
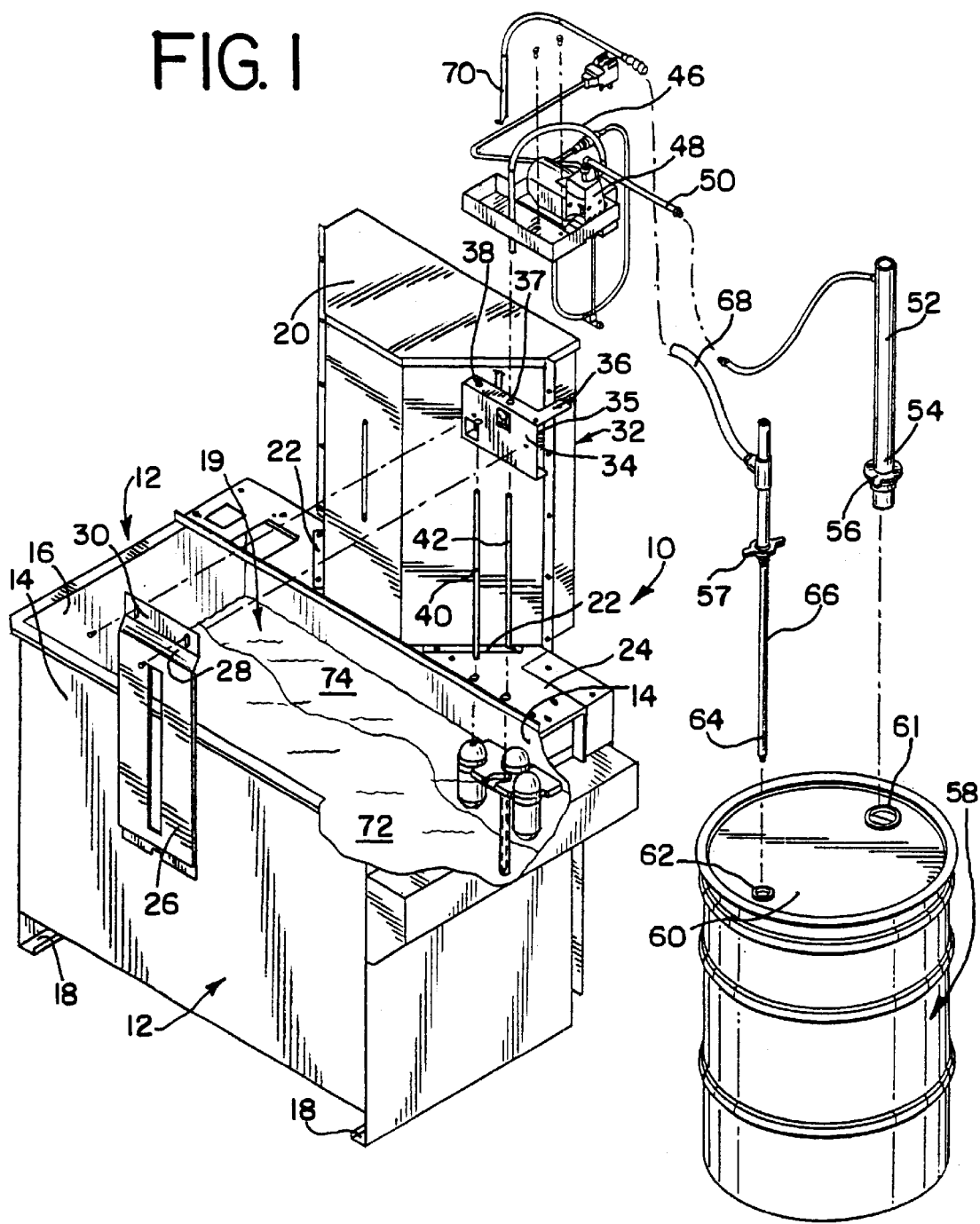
FIG. 1 is a perspective view, with portions shown exploded, of a hot tank including the oil skimmer of the present invention and certain parts used with the oil skimmer of the invention.
Figure 4:
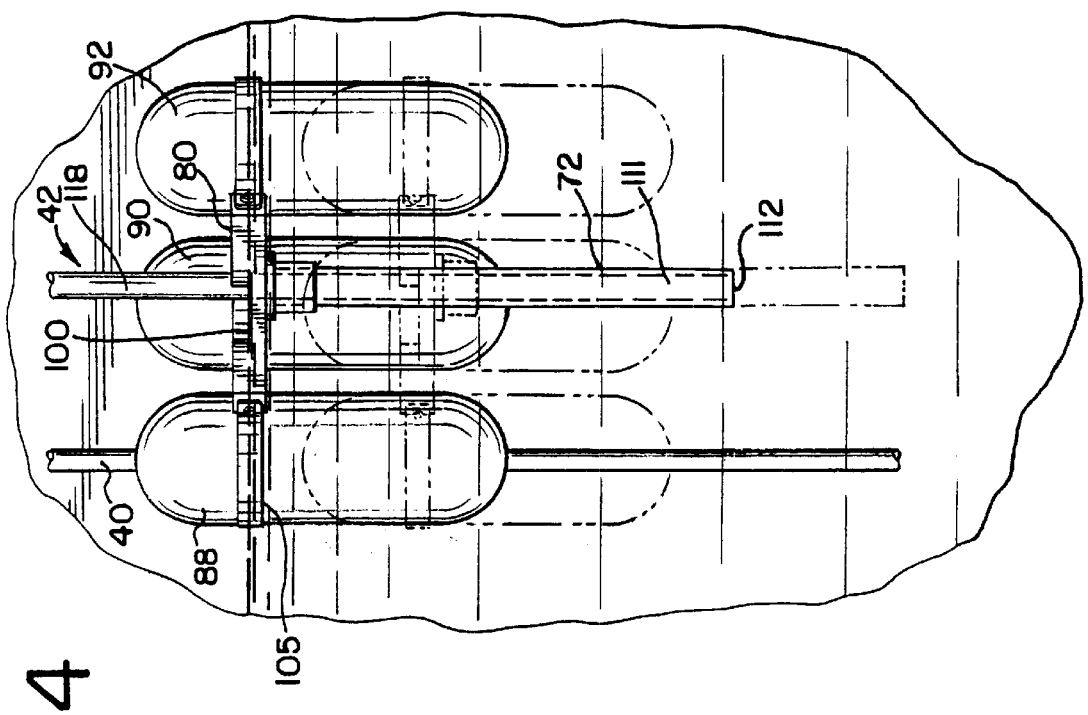
FIG. 4 is a front elevational view, showing one position of the oil skimmer in relation to the water surface, and showing an alternate position thereof in phantom lines.

While it will be understood that the present invention may assume a number of different forms, and may be embodied in different combinations, a description thereof will be made of two embodiments of the invention wherein the skimmer is used to skim a water-oil mixture from a water surface and is associated with a tank such as a hot tank or the like which is used for degreasing automotive or other mechanical parts.

Accordingly, the skimmer generally designated 10 will be shown to be used with a hot tank generally designated 12 for illustrative purposes. The tank has side walls 14 and end walls 16, comprising a tub-like arrangement resting on feet 18. The hot tank contains a water-surfactant mix 19, usually referred to herein as an aqueous solution or emulsion. A guard 20 is attached by fasteners extending through flanges 22 to the rear shelf 24 of the hot tank 12. A vertical panel 26 is fastened by an offsetting portion 28 and a mounting flange 30 to a protective structure generally designated 32.

The mounting bracket 36 includes a front face panel 34 and a horizontal flange 35. Openings 37, 38 are shown to be provided for purposes of having a guide rod and a dip tube extending therethrough.

In the preferred embodiment, the openings 37, 38 in the panel 34 secure a guide rod 40 and a suction tube 42 in relatively fixed positions. The suction tube 42 is connected by curved line 46 to the inlet of a pump 48, which alternately draws the fluid in through line 46 and expels it through a conduit 50 to a standpipe 52. The standpipe 52 has a lower end portion 54 which is secured to a fitting 56 which fills the opening 61 in the accompanying barrel 58. The barrel 58 is shown to include a cover 60 which also includes an opening 62 for receiving the lower end portion 64 of a water return pipe 66. The pipe 66, secured by a fitting 57, is connected by hose 68 and a water return line 70 to the rear of the interior of the dip tank 12 between the float 10 and the rear wall 14.

Referring now particularly to FIG. 2, the skimmer assembly generally designated 10 floats at a precisely determined level on top of the water 72 in the tank 12, which is schematically shown to have a film of oil 74 on at least a portion thereof. Referring again to FIG. 2 in greater detail, the composite skimmer unit generally designated 10 is shown in its preferred form to include a specially shaped body portion 80 which is made from a thermoplastic material, preferably polypropylene.

This portion 80 has a peripheral wall 81 that is generally rectangular-shaped with cut-out portions generally designated 82, 84, 86 for receiving and fastening the floats 88, 90, 92. The floats 88, 90, 92 are preferably made from a stainless steel material, and are secured by a combination of straps 94 and fasteners 96 in their desired position within the cutouts 82, 84, 86. These floats may be adjusted up and down by perpendicular movement thereof relative to the body, which gross adjustment is occasioned by loosening the fasteners and pushing the floats in the desired direction.

Once the gross adjustment has been performed and the float installed in the tank, the fine or vernier adjustment is made using the auxiliary weight assemblies generally designated 91, 93, as will be described. There is also a vertically extending passage 116 which extends all the way through the float 88 and thus slidingly accommodates a guide rod 40.

The body 80 is also shown to include a contoured recess generally designated 89 and forming an inlet for the oil film and a certain amount of water. The recess is defined by a combination of contoured side wall generally designated 98 extending inward from the peripheral wall 81 and a level horizontal shelf 100. A horizontal opening for a film of oil and water 103 is located toward the rear of the shelf 100. The shelf 100 lies above the bottom wall 105 of the body 80 by the height of a reduced height wall 106, which is a small fraction of the peripheral height of the entire end wall 81.

The preferred profile of one form of the recess 89 itself is defined by the contours of the side wall generally designated 98. This profile generally forms a re-entrant portion having a number of segments. These are, respectively, a reduced height entrance wall portion 94 having radiused ends, a wall portion 95 and a straight, higher entrance portion 96, both lying substantially perpendicular to the peripheral wall 81, an angled portion 97 and a curved portion 98 surrounding most of the horizontal opening 103. The recess profile further includes a perpendicular section 99 and a reduced height extension 101 which is also perpendicular to the peripheral wall 81. A counterpart 104 to the wall portion 94 is also present, leaving identical, nearly flat oil return surfaces 108, 109 whose function is described in detail herein.

The recess or channel described includes a preferred, although not necessary, feature of the invention. This is the skim gap confirmation device generally designated 107. This consists of two notches in the side walls 96, 99, whose generally horizontal end portions 108, 109 are very slightly inclined from the horizontal, so as to facilitate liquid drainage therefrom and to insure accuracy of the skim gap measurement. Thus the preferred skim gap height is set equal to or just smaller than the dimension of the reduced height wall section 95, 101.

The liquid can equal this height, and if it slightly exceeds the gap, the oil will run onto the inclined surfaces 108, 109. Then, the skim gap can be lowered and the oil accumulated on surfaces 108, 109 will drain off, making accurate readings easier. The inclined surfaces 108, 109 permit any accumulated oil to drain off. The desired skim gap is shown as "A" and dimension "B" is typically $1/64$" greater than "A". These dimensions are exaggerated for clarity.

The fine or vernier adjustment can be achieved without moving the larger or principal floats 88, 90, 92. This is done by the mechanism 91, 93, shown in FIG. 2A. Here, a post 120 extends a substantial height above the top surface of the body 80. Washers 122 weighing approximately 2 grams each are placed in pieces on the posts until the virtually exact skim gap desired is achieved. The washers are secured by clips 124, 125 which are readily removable. The washers are preferably added equally, but could be placed on the posts 120, 121 unevenly if this were desired for some reason.

A collection tube generally designated 130 for accommodating the oil and water layer skimmed from the surface terminates at its upper end 131 at the shelf 100 and is shown to have a cylindrical side wall 131, a closed lower end portion 132, a threaded top part 134 and to be thus fastened in place in registry with the horizontal opening 103.

The suction tube 42 includes a hollow, cylindrical side wall 140 and an open bottom end generally designated 141. The suction tube is disposed inside the body of the collection tube generally designated 130 and serves as the second guide for the skimmer unit 10. It remains stationary as the float moves us and down.

In the use of the device, the skimmer is placed in the corner of a hot tank or the like, as shown. The greasy parts are placed on a support unit (not shown) and lowered into the hot tank. Surfactant, if not already present, is added to the aqueous solution. This surfactant is used to dislodge large amounts of oil, grease and dirt from mechanical parts, ultimately resulting in a layer of oil or grease on the surface of the liquid. In the alternative, for example, the surfactant may dislodge a cutting oil used in a machining or post-machining application where it is desired to remove the oil from the finished part. However, the skimmer is effective with many types of oils, including those just enumerated.

At any rate, the surfactant causes a certain amount of the oil to undergo emulsification, but the larger portion of the oil, being of lower density than the water, collects on the surface of the aqueous solution or emulsion. The oil coalesces into sheet form, forming a thin film, which, in these embodiments, extends into the corner of the hot tub, as shown (FIG. 1). From here, the layer of the oil and/or grease and the topmost layer of water atop which it is floating, are both inducted into the skim gap, which is shown in FIG. 5 and which is defined as the distance that the shelf 100 is under the surface of the liquid. Skim gaps of $3/32$" to $1/4$" are preferred, although the presently preferred gap is about $7/64$". Different skim gaps may also be operative.

Consequently, in use, the oil 74 and water film enter this shelf and pass downwardly into the collection tube 110 along with a certain amount of the water 72, as determined by the velocity gradients within the aqueous layer. The oil 74 and water 72 then pass into the collection tube 110. The collection tube 110 has disposed inside it a suction tube 118. The withdrawing force that is applied to the suction tube 118 is preferably a slow, low-shear pump, such as a bellows pump. The water and oil from the area 131 are drawn upwardly into the pump, and from there they pass through the line 50 and the pipe 52 to the oil-water separator contained in the barrel 58. As an alternative, a gear pump may be used. A peristaltic pump or other style of positive displacement pump may also prove effective.

At this point, the oil floats to the top of the barrel and it may be discarded or kept. The major portion of the water (actually, an aqueous emulsion) is returned via tube 64, 66 and lines 68, 70 to the tank 12. This can continue until almost all of the barrel 58 is filled with oil. Then, the barrel is discarded and a new barrel replaces the old one. A major advantage to this system is that the aqueous solution or emulsion is also returned to the bath. This means that whether the skimmed liquid is nearly all oil, nearly all water, or something between, will make little difference as far as keeping the level in the tank relatively constant is concerned.

Referring now to the material from which the body 80 itself is made, this is preferably polypropylene. This has the advantages of being virtually inert and resistant to high temperatures of the type which it will encounter, namely, up to just less than 212° F. The collection tube 130 is preferably made from the same material. The advantage of this material is that its density closely approximates that of water, being about 0.95 gram/ml.

The floats 88, 90, 92 are preferably made from a hollow stainless steel material. This material has a smaller coefficient of thermal expansion than the aqueous solution, and the polypropylene's coefficient is greater, and so the buoyancy of the floating unit as a whole is not materially dependent on temperature. This helps in maintaining a relatively constant skim gap throughout a fairly wide range of working temperatures.

The apparatus, for reasons not fully understood, but which may include convection currents within the heated tank, may be located in a corner, as shown. If for any reason the convection currents are different, e.g., heat applied only to the periphery, then the location of the apparatus could change.

Although the reasons for the success of the invention are not known with certainty, and although the invention is not to be confined to any particular theory or mode of operation, it is thought that the main reason for the success of the unit is that the skimmer can be set for an optimum skim gap and is able to reasonably maintain it over a fairly wide range of operating conditions. However, other factors also contribute such as the oil concentrating effect of the Prandtl boundary layer in the aqueous phase flowing over the floor of the inlet. Also utilizing thermal convection currents to bring the oil film close to the inlet may contribute to the success of the invention. These things help to concentrate the oil in the skimate so that an oil film may be skimmed off quickly with a low skimate flow rate. This in turn allows sufficient residence time for oil to separate efficiently in a fairly small oil separator.

In order to keep the recess in a particular position, guide means are provided in the form of the rod 40 and the suction tube 110. The preferred method of providing these at lowest cost has been shown, but other means of guiding the float-body combination will occur to those skilled in the art. The floats are attached by a system of cutouts which provides stability but allows for easy adjustment; another system may be used. The pockets 82, 84, 86 make for the most compact construction, but other means of locating the floats may be provided.

Another embodiment of the invention is shown in FIGS. 6–8. This form of invention is shown to comprise a floating assembly generally designated 200, which in some respects resembles the other embodiment, but differs therefrom principally in that there is only one float and one guide. Also, the suction system differs somewhat.

This skimmer 200 includes a rounded submersible float 202, a generally square (in plan view) polypropylene cap float 204, and a single guide rod 206 which extends down through openings 208, 210 in the floats 202, 204. The float 202 is held in place and secured to the cap float 204 by fasteners 212, 214. The guide rod 206 extends closely surrounded by, but freely allowing motion between itself 206 and the floats 202, 204 down to the lowest anticipated level reached by the float 204 in use, thus leaving a portion 216 below the fastener 212.

A skimmer inlet in the form of a recess generally designated 218 is also provided in this embodiment. The inlet 218 comprises a cutout portion in the cap float 204 having the shape when viewed from above (FIG. 6) of a mirror imaged "D". This inlet or recess includes a vertical portion defined by a pair of parallel side walls 220, 221 and a rounded rear wall 223. The recess has a floor or shelf 222 with a circular opening 224 just inside the rounded wall 223 formed in the floor or shelf 222.

The skim gap exceeds the height of the partial wall 225 by about $\%_{64}$". The aqueous level is shown schematically and exaggerated for clarity at 227, that is, the cap float 204 rides in the aqueous layer slightly below the point whereat the upper surface 229 of the cap float joins the vertical edge surface 231.

Extending downwardly and in communication with the opening 224 is a cup generally designated 226. The cup 226 may be held in place by a plate 235 and fasteners 237. This cup 226 has an imperforate bottom wall 233 and is shown to include a fastening means in the form of a stub cylinder 228 in the side wall 230 thereof for attachment of a suction hose 232. The suction hose 232 is loosely coiled about the guide rod 206 in use, and this loose spiral allows the floats 202, 204 to move vertically without any material resistance.

Figure 3:
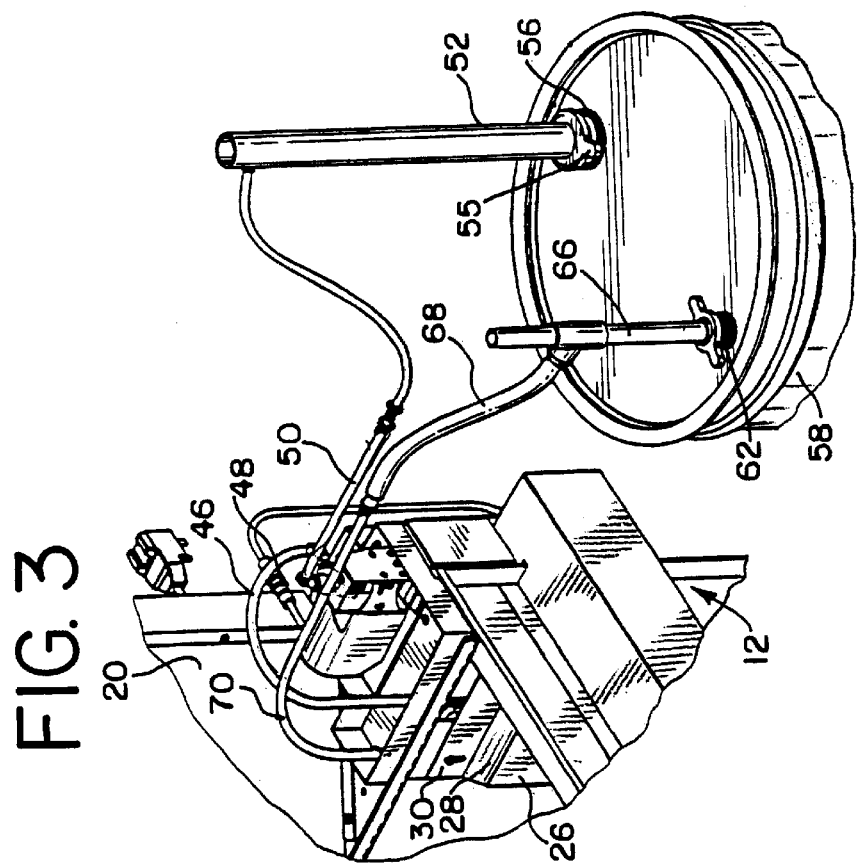
FIG. 3 is a perspective view of the pump and the associated oil-water separator associated therewith.

The other end of the suction hose 232 (not shown) terminates in a fitting attached to the pump (also not shown) for withdrawing an oil and water mixture that is skimmed from the cup 226 in the same manner as their counterparts 46, 48 in FIGS. 1 and 3, for example.

The float 202 is preferably hollow and is made from a stainless steel material, preferably about 3" to 5" in diameter and 3" to 5" long. It is totally submerged in use. The polypropylene cap float, however, is intended to lie such that the floor or shelf 220 thereof is submerged by about $\%_{64}$", more or less. The skimmer 200 may have weights (not shown) similar to that of FIG. 2A attached for vernier adjustment of the skim gap.

It will thus be seen that the present invention provides a novel oil skimmer having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. An oil skimmer for removing a film of oil and water from atop an aqueous bath, said skimmer comprising, in combination, a first body portion, said body portion including an entrance in said body for skimmed oil and water, said entrance being defined by substantially vertical walls and a generally flat shelf portion, at least one horizontal opening in said shelf portion for oil and water, and a collection tube communicating with at least one said horizontal opening, said collection tube including a closed portion at its lower end and being secured around said horizontal opening at its upper end thereof, at least one float secured to said body portion, a suction tube having an open lower end disposed within said collection tube, and thereby serving as a guide for said body, as said body undergoes vertical movement, an evacuator providing suction for withdrawing said oil and water mixture for further separation, and a return line for returning water from a reservoir holding a separated oil-water mixture, said oil skimmer additionally having at least one guiding element extending through another portion of said skimmer, thereby limiting the horizontal movement of said body in use, and whereby said entrance remains oriented in a single position.

2. An oil skimmer as defined in claim 1, wherein said at least one float comprises three floats, arranged about the periphery of said body.

3. An oil skimmer as defined in claim 1, which further includes plural floats and wherein one of said plural floats has an opening extending vertically therein, said float having a guide member extending therethrough, thereby permitting substantial vertical movement of said body portion while preventing horizontal movement, including rotation, of said oil skimmer.

4. An oil skimmer as defined in claim 1, wherein said collection tube is threadedly connected to said body portion about the upper end of said collection tube.

5. An oil skimmer as defined in claim 1, said body portion including only one shelf and one opening therein.

6. An oil skimmer as defined in claim 1, wherein said substantially vertical wall is a contoured side wall extending from said point at which said shelf meets the remainder of said body, said side wall being of a larger circumference than said horizontal opening and extending therearound in a curvilinear form.

7. An oil skimmer for removing a film of oil and water from atop an aqueous bath, said skimmer comprising, in combination, a first body portion, said body portion including an entrance in said body for skimmed oil and water, said entrance being defined by substantially vertical walls and a generally flat shelf portion, at least one horizontal opening in said shelf portion for oil and water, and a collection tube communicating with at least one said horizontal opening, said collection tube including a closed portion at its lower end and being secured around said horizontal opening at its upper end thereof, at least one float secured to said body portion, a suction tube having an open lower end disposed within said collection tube, said suction tube having said open lower end lying beneath said opening for skimmed oil and water, as said body undergoes vertical movement, an evacuator providing suction for withdrawing said oil and water mixture for further separation, and a return line for returning water from a reservoir holding a separated oil-water mixture.

8. An oil skimmer as defined in claim 7, wherein said substantially vertical wall portion has an extent substantially perpendicular to said outer edge of said body, a first angular inclined portion extending away from said peripheral wall, a second angular inclined portion extending back towards said peripheral wall, and a third portion being generally curvilinear and surrounding said horizontal opening.

9. An oil skimmer as defined in claim 7, which includes at least one generally vertically extending post, said at least one post accommodating plural, separable weights thereon, said weights being arranged for removable application to said posts.

10. An oil skimmer as defined in claim 7, wherein said at least one post comprises two posts.

11. An oil skimmer as defined in claim 7, wherein each of said posts includes a removable formation for closing off the tops of said posts when said weights are placed over said posts.

12. An oil skimmer as defined in claim 7 wherein said entrance to said shelf has a principal flat area having, on at least one side, a slightly inclined vernier adjustment wall portion offset vertically from said principal flat area by a stub wall, whereby adjustment to the skin gap may be readily visualized and made.

13. An oil skimmer as defined in claim 7, wherein said skimmer has a suitable coefficient of thermal expansion with temperature by utilizing at least two different materials of construction having different coefficients of thermal expansion for said first body portion and for said at least one float, whereby the buoyancy of said first body portion and said float change in such a way with different temperatures so as to tend to cancel each other out.

14. An oil skimmer for removing a film of oil and associated water from atop an aqueous bath, said skimmer including a floating body having a submerged portion and a freeboard portion, and constructed and arranged to have a predetermined level of water in which said body is immersed at a certain height, one auxiliary float secured beneath said floating body, a reentrant portion of said floating body having a substantially flat floor portion lying just below the level of water to establish a given skim gap, said reentrant portion including a continuous substantially vertical side wall having portions defining said entrance portion and further portions defining a rounded vertical wall portion at the end opposite said entrance portion, a horizontal opening in said floor for passage of just less than a skim gap thickness of said oil film and water, a receiver for oil and water communicating with said opening in said floor, suction means operatively associated with said receiver, said suction means including an evacuator pump and a flexible withdrawal line, whereby oil and water in said receiver may be transferred from said skimmer to a remote reservoir, and guide means extending through said float and said body, said guide means being offset from said horizontal opening in said floor, and said flexible withdrawal line preventing free horizontal movement of said float but allowing vertical movement thereof throughout a given range.

15. An oil skimmer as defined in claim 14, wherein said receiver is in the form of a first, closed end elongated tube and said suction means is a second tube lying generally concentrically within said first tube.

16. An oil skimmer as defined in claim 14, wherein said receiver is in the form of a shallow cup.

17. An oil skimmer as defined in claim 16, wherein said suction means comprises an elongated hose, said elongated hose joining the side wall portion of said cup.

18. An oil skimmer as defined in claim 14, wherein said at least one float comprises a single float lying entirely beneath said floating body.

* * * * *